(No Model.)

J. E. WINDLE.
FRICTION CLUTCH.

No. 586,784. Patented July 20, 1897.

Witnesses.
Fred S. Greenleaf
Thomas J. Drummond

Inventor
John E. Windle
By Crosby & Gregory
attys.

UNITED STATES PATENT OFFICE.

JOHN E. WINDLE, OF WORCESTER, MASSACHUSETTS.

FRICTION-CLUTCH.

SPECIFICATION forming part of Letters Patent No. 586,784, dated July 20, 1897.

Application filed June 26, 1896. Serial No. 597,074. (No model.)

*To all whom it may concern:*

Be it known that I, JOHN E. WINDLE, of Worcester, county of Worcester, State of Massachusetts, have invented an Improvement in Friction-Clutches, of which the following description, in connection with the accompanying drawings, is a specification, like letters on the drawings representing like parts.

This invention has for its object the production of a simple, compact, and powerful friction-clutch adapted to connect or disconnect a driving and a driven member in a rapid and an effective manner.

I have herein shown my friction-clutch as applied to a shaft, the member to be driven, the driving member being shown as a pulley rotated from any suitable source of power.

Figure 1:
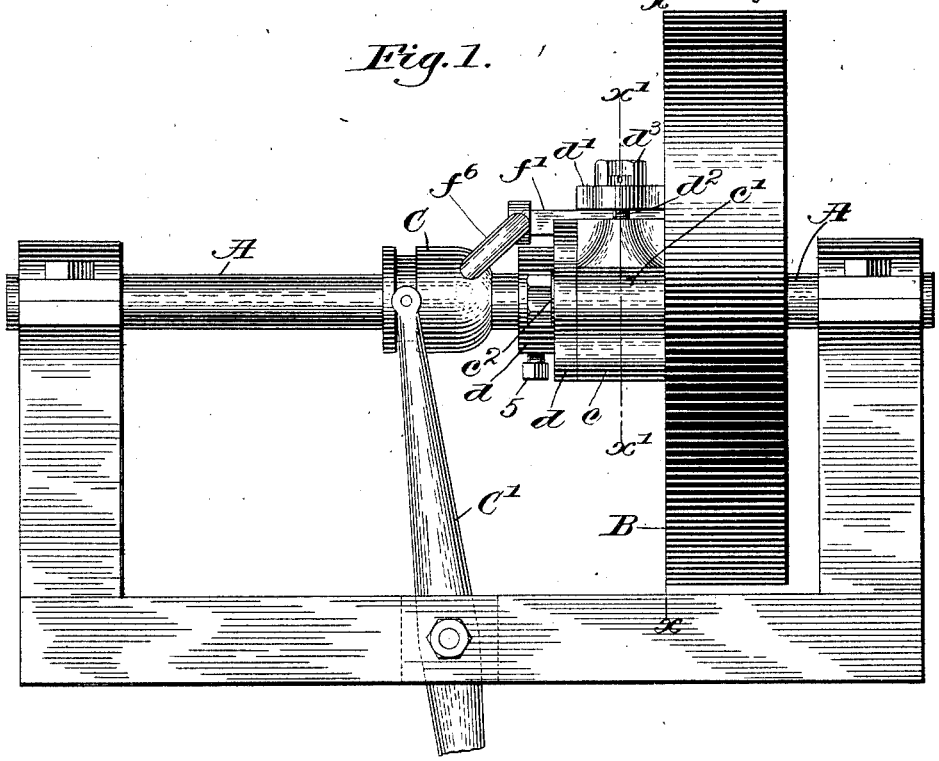
Figure 2:
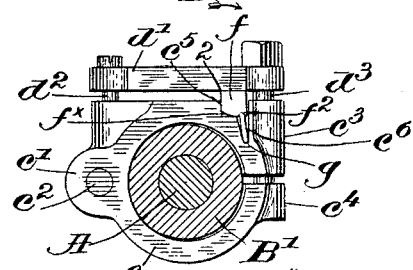
Figure 3:
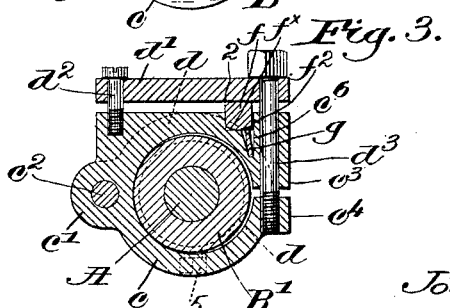

Figure 1 represents in side elevation a clutch-pulley embodying my invention in unclutched position. Fig. 2 is a vertical section taken on the line $x\,x$, Fig. 1; and Fig. 3, a similar view through the clutch member on the line $x'\,x'$, Fig. 1.

The shaft A, the member to be driven, supported in suitable bearings, the cam or cone C, movable on the shaft, and the actuating-lever C', to slide the cone upon the shaft, may be and are of any well-known or desired construction. The driving member is shown as a pulley B, loose on the shaft A and having a prolonged hub B', to be engaged by the clutch member, secured to the shaft.

The clutch member comprises a clamp $c$, (shown as a split ring or collar,) loosely surrounding the hub B' of the pulley and having a bearing $c'$ for a stud $c^2$, on which is pivotally mounted a disk or plate $d$, secured to the shaft A in suitable manner, as by a set-screw 5. A plate $d'$ is mounted on the clamp $c$ and adjustably secured thereto by the threaded bolts $d^2\ d^3$ passing loosely therethrough, the bolt $d^3$ extending loosely through a boss $c^3$ on one part of the clamp and entering a threaded ear $c^4$ on the other part, as clearly shown in Figs. 2 and 3. The clamp is recessed at $c^5$ to receive the squared end $f$ of a rocker $f'$, which enters the seat $c^5$ and is held therein by the plate $d'$, the inner face of the rocker being notched at $f^2$ near its outer corner to engage a flat arm $g$, seated in a V-shaped slot $c^6$ in the clamp, the plate $d'$ forming an abutment for the rocker when rotated to close the clamp. The squared end $f$ of the rocker and the arm $g$ form the two members of a normally-broken toggle-joint, partial rotation of the rocker in the proper direction straightening the toggle more or less to apply the clamp, the arm $g$ rocking in the slot $c^6$.

When the rocker is turned in the direction of arrow 10, Fig. 2, the corner 2 of the squared end $f$ exerts an upward pressure on the plate $d'$, while the notched corner presses down and inwardly upon the arm $g$, the straightening of the toggle thus effected pressing the adjacent part of the clamp $c$ toward the part provided with the ear $c^4$.

The bolt $d^3$ through the ear $c^4$ transmits the pressure on the plate $d'$ to the other part of the clamp, drawing together the separated ends thereof and clamping it around the hub B', causing the shaft to rotate in unison with the pulley B.

I prefer to round one edge of the rocker, as at $f^{\times}$, to render its movement easier in the seat $c^5$ of the clamp.

By lengthening or shortening the bolts $d^2\ d^3$ the pressure of the clamp upon the hub may be adjusted, and I compensate for wear by the same means.

The free end of the rocker $f'$ is extended parallel to the shaft A beyond the plate $d$, and it is bent over laterally or has secured thereto an arm $f^6$, Fig. 1, to be engaged by the cone C in operating the clutch.

When the larger part of the cone C is pushed beneath the arm $f^6$, viewing Fig. 1, the outer end of the arm will be lifted, thereby turning the rocker $f'$ in the direction of arrow 10, Fig. 2, to operate the clutch.

By attaching the pulley-hub or a similar device to the end of an adjacent shaft the clutch may be used as a shaft-coupling.

Having fully described my invention, what I claim, and desire to secure by Letters Patent, is—

1. In a friction-clutch device, a driving member, a member to be driven, a clamp secured to one and adapted to engage the other of said members, a toggle mounted on one part of the clamp, and including a rocker, an independent abutment for the rocker, rigidly connected with the other part of the clamp, rotative movement of the rocker straightening the toggle to compress the clamp, and means to rotate the rocker, substantially as described.

2. A driving member, a member to be driven, a clamp composed of a split collar secured thereto and embracing the driving member, said collar having in one part a seat and an adjacent slot, an abutment connected with the other part of the collar, a rocker having a squared end to enter the seat and rest against the abutment, a blade-like member movable in the slot and in engagement with the end of the rocker, to form a toggle, whereby the clamp is contracted, and means to operate the toggle, substantially as described.

3. A driving member, a member to be driven, a clamp secured to one and adapted to engage the other, said clamp having a seat and adjacent slot in one part, an abutment adjustably connected with the other part of the clamp, a toggle mounted in the seat and slot, between the abutment and clamp, to contract the latter, and means to operate the toggle, substantially as described.

4. A driving member, a member to be driven, a non-continuous clamp secured to one member and to engage the other, an abutment or rest positively connected with the clamp at opposite sides of its opening, and means interposed between and to act in opposite directions upon the abutment and the adjacent portion of the clamp to separate them and thereby compress the latter, substantially as described.

5. A driving member, a member to be driven, a clamp composed of a split collar secured to one and surrounding the other, an abutment adjustably connected with the collar at opposite sides of its opening, a toggle interposed between the abutment and the adjacent portion of the collar, and means to operate the toggle, straightening of the toggle compressing the collar, substantially as described.

In testimony whereof I have signed my name to this specification in the presence of two subscribing witnesses.

JOHN E. WINDLE.

Witnesses:
J. S. WARREN,
W. H. LEWIS.